US011993053B2

(12) United States Patent
Peterlini

(10) Patent No.: US 11,993,053 B2
(45) Date of Patent: May 28, 2024

(54) DEVICE FOR PRODUCING CUSHIONING ELEMENTS

(71) Applicant: GP System, Annecy (FR)

(72) Inventor: Jacky Peterlini, Annecy le Vieux (FR)

(73) Assignee: GP System, Annecy (FR)

( * ) Notice: Subject to any disclaimer, the term of this patent is extended or adjusted under 35 U.S.C. 154(b) by 65 days.

(21) Appl. No.: 17/761,085

(22) PCT Filed: Sep. 17, 2020

(86) PCT No.: PCT/EP2020/075951
§ 371 (c)(1),
(2) Date: Mar. 16, 2022

(87) PCT Pub. No.: WO2021/053061
PCT Pub. Date: Mar. 25, 2021

(65) Prior Publication Data

US 2022/0339902 A1 Oct. 27, 2022

(30) Foreign Application Priority Data

Sep. 17, 2019 (FR) ...................................... 1910260

(51) Int. Cl.
*B31D 5/00* (2017.01)

(52) U.S. Cl.
CPC .... *B31D 5/0052* (2013.01); *B31D 2205/0047* (2013.01)

(58) Field of Classification Search
CPC .................. B31D 5/0052; B31D 5/006; B31D 2205/0047
See application file for complete search history.

(56) References Cited

U.S. PATENT DOCUMENTS

| | | | | |
|---|---|---|---|---|
| 4,717,613 | A * | 1/1988 | Ottaviano | B31D 5/0047 428/129 |
| 7,740,573 | B2 * | 6/2010 | Manley | B31D 5/0047 493/464 |
| 8,920,299 | B2 * | 12/2014 | Keller | B31D 5/0043 493/464 |
| 2004/0050743 | A1 * | 3/2004 | Slovencik | B65D 81/09 206/521 |
| 2011/0053751 | A1 * | 3/2011 | Arora | B31D 5/0047 493/464 |

(Continued)

FOREIGN PATENT DOCUMENTS

| | | |
|---|---|---|
| DE | 19858537 A1 | 6/2000 |
| GB | 2508267 A | 5/2014 |

(Continued)

OTHER PUBLICATIONS

International Search Report of International Application No. PCT/EP2020/075951 dated Dec. 1, 2020 and English Translation (4 pages).

*Primary Examiner* — Andrew M Tecco
*Assistant Examiner* — Nicholas E Igbokwe
(74) *Attorney, Agent, or Firm* — Lippes Mathias LLP

(57) ABSTRACT

A device for the production of padding products has a product guide, a product drive along a drive axis (Y), and a product crumpling device. The guide is attached to a part of the device mechanically at at least a part of its section and is held on another part of the device by magnetic repulsion forces.

9 Claims, 4 Drawing Sheets

(56) References Cited

U.S. PATENT DOCUMENTS

| | | | | |
|---|---|---|---|---|
| 2014/0048384 A1* | 2/2014 | Borghi | B65G 47/715 198/367 |
| 2014/0162024 A1* | 6/2014 | Deis | B65D 81/127 493/464 |
| 2020/0094511 A1* | 3/2020 | Peterlini | B31D 5/0047 |

FOREIGN PATENT DOCUMENTS

| | | | |
|---|---|---|---|
| WO | WO 9947347 A1 | 9/1999 |
| WO | WO 2018115746 A1 | 6/2018 |

* cited by examiner

[Fig. 1]
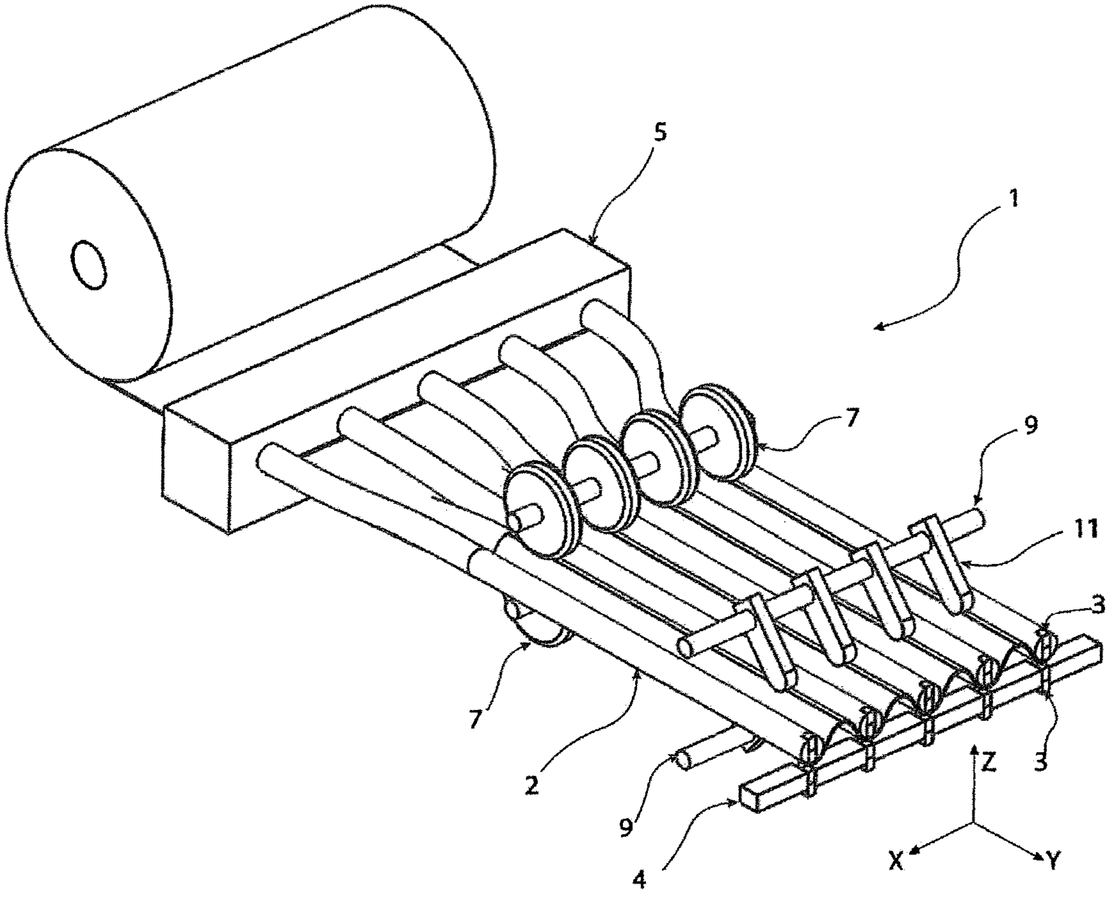
[Fig. 2]
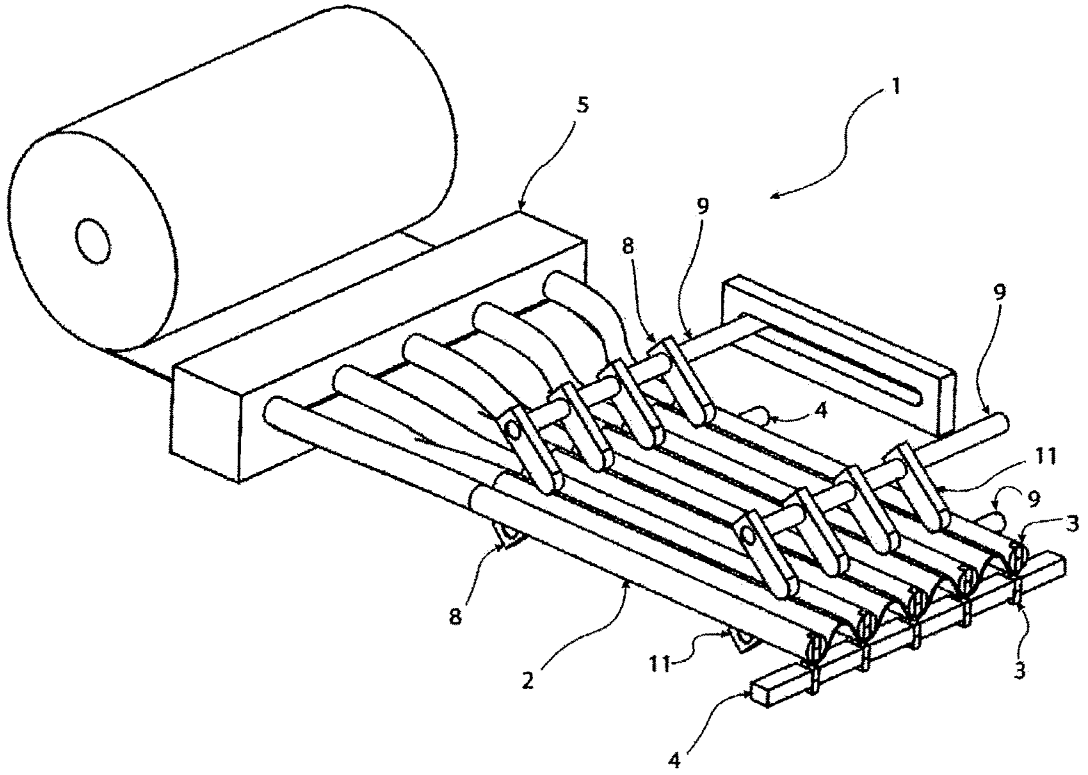

[Fig. 3]
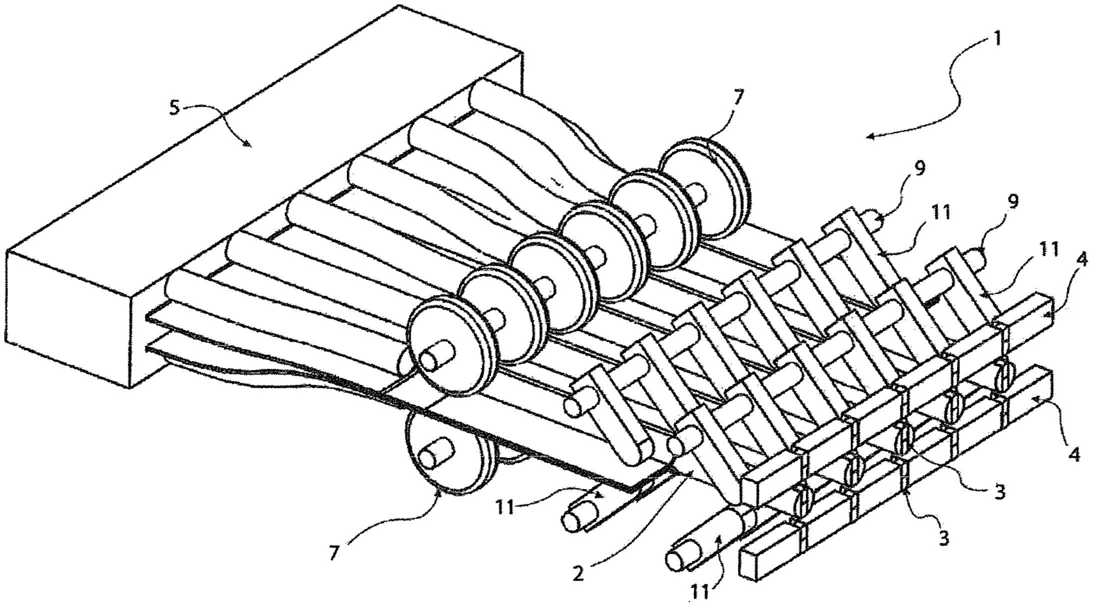
[Fig. 4]
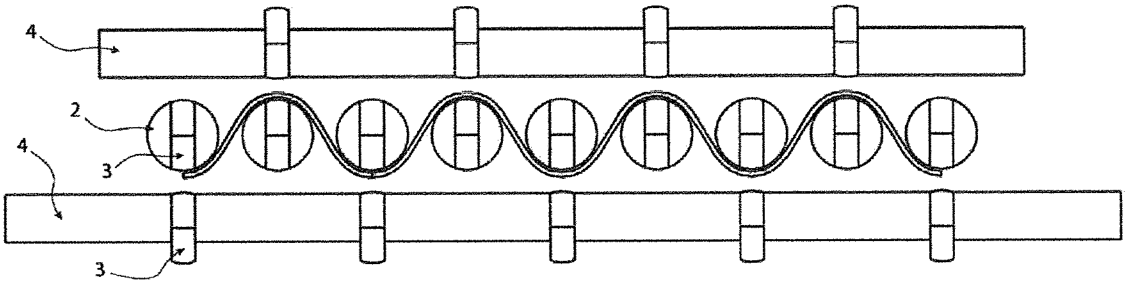

[Fig. 5]
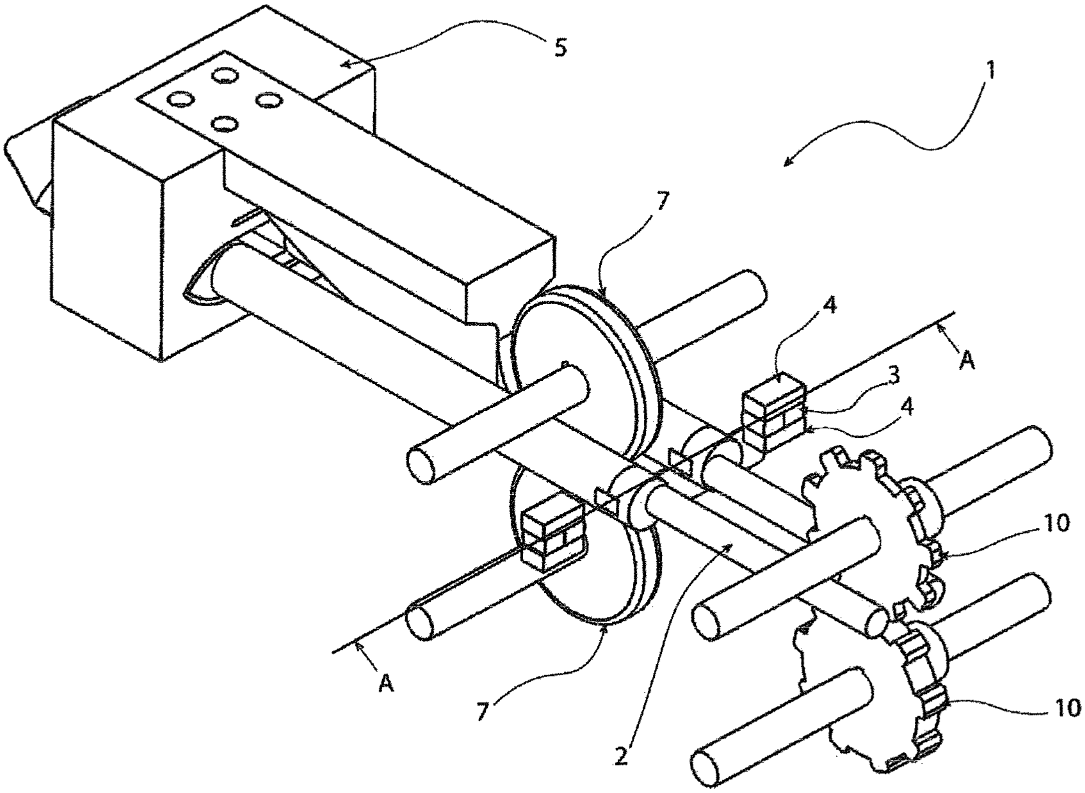
[Fig. 6]
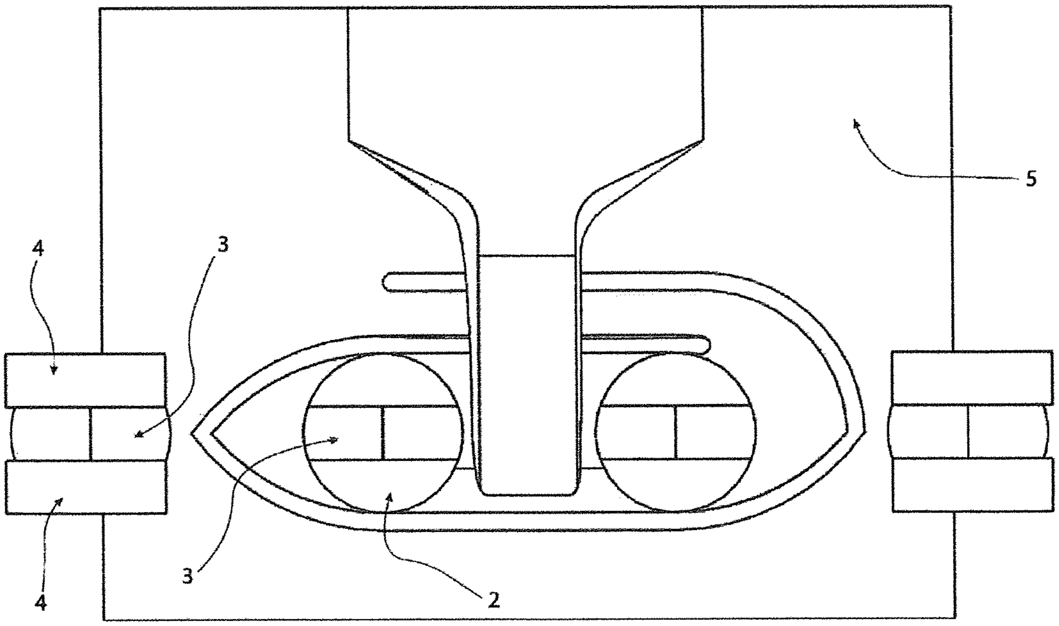

[Fig. 7]
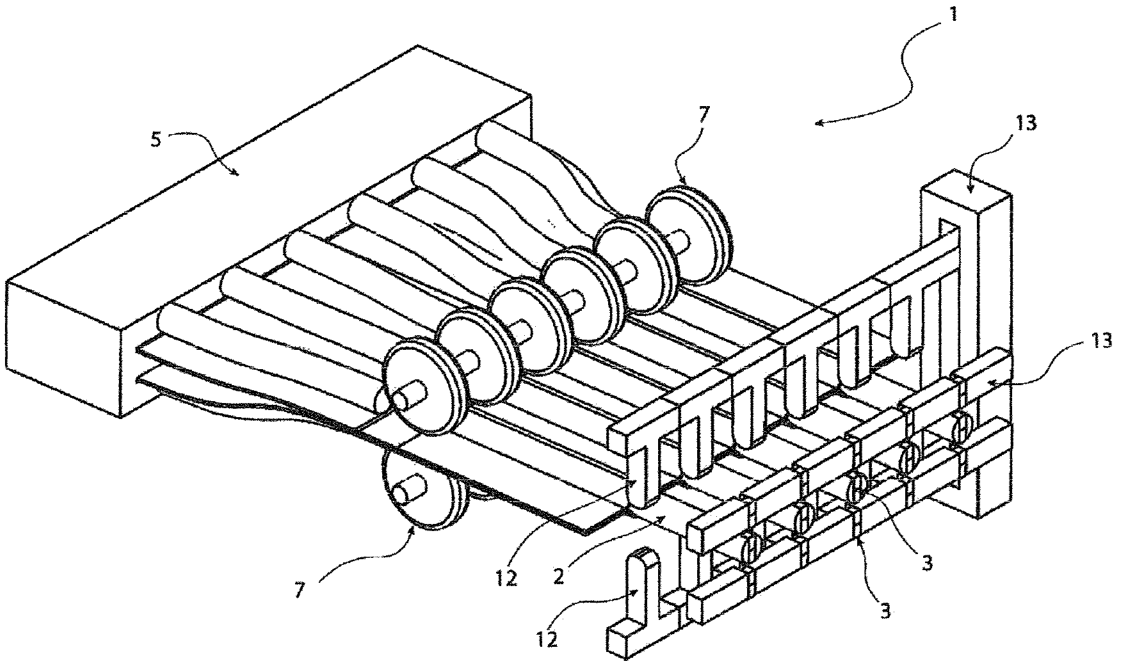

DEVICE FOR PRODUCING CUSHIONING ELEMENTS

BACKGROUND OF THE DISCLOSURE

The present invention concerns a production device for a paper stuffing component, comprising a means of magnetic support of a means used to guide the product.

Placement of stuffing components or padding components in a carton, fills the gaps in a cardboard box by being positioned at the outside of items to be packaged for their protection during transport and handling operations.

Although the manufacture of these components from crumpled sheets of paper is becoming more widespread, padding components made of plastic in the shape of chips or bubble wrap, or even an inflated pouch, are still widely used by distribution companies, in particular online sales companies.

The dramatic environmental impact of these plastic components, which represent considerable volumes, needs no further demonstration. Solutions for substitution that have a negligible impact on the environment and which are industrially practical must be developed in order to offer a short-term replacement for these stuffing components and plastic padding.

One of the drawbacks of producing padding components made of crumpled paper is the risk of paper jamming during drive and crumpling operations of strips of paper along a guide means.

Paper jamming can occur both when the paper is being driven and during the crumpling and cutout operations.

BRIEF SUMMARY OF THE DISCLOSURE

The present invention proposes a production device for stuffing and padding components that makes it possible to remedy the abovementioned drawbacks.

This way, the stuffing product production device according to the invention comprises a guide means for the product, a drive means for the product along a drive axis, a means of crumpling the product, characterized by the fact that the guide means is attached to a part of the device, on the one hand, mechanically at at least one part of its exterior, and, on the other hand, supported at another part of the device by magnetic repulsion forces at at least one other part of its exterior.

According to one characteristic, the part of the section of the guide means that is supported by magnetic repulsion forces is held on a magnetic support, so that it forms a space between the guide means and the magnetic support.

According to the previous characteristic, the guide means and the magnetic support each comprise a permanent magnet and/or an electromagnet arranged two by two, opposite each other.

According to the previous characteristic, the end or largely the end of the guide means is free and held in place by magnetic repulsion forces to the magnetic support.

According to some manners of embodiment, the magnetic support consists of a bar or of two bars arranged opposite each other on either side of the guide means.

According to other manners of embodiment, the magnetic support consists of an enclosure or of a portion of enclosure surrounding a part of the guide means.

According to one additional characteristic, the guide means is mechanically attached to a shaping block as a supply means, placed upstream of the drive means.

According to the previous characteristic, the shaping block consists of two slots designed to be filled by a product, or one slot whose ends overlap and which is designed to supply a product that is folded onto itself.

According to one additional characteristic, the guide means is mechanically fastened between two slots or between the slot whose ends overlap.

According to another manner of execution, at least one part of the guide means' section is mechanically attached to the means of crumpling or to the drive means.

BRIEF DESCRIPTION OF THE DRAWINGS

The implementation of the invention will be better understood using the detailed description that is shown below with reference to the attached drawings, in which:

FIGS. 1 through 8 show production devices for the stuffing component according to the manners of embodiment of the invention.

FIG. 1 is a perspective view according to a first manner of embodiment.

FIG. 2 is a perspective view according to a second manner of embodiment.

FIG. 3 is a perspective view according to a third manner of embodiment

FIG. 4 is a section view, illustrating the means of magnetic support, according to another alternative of the third manner of embodiment.

FIG. 5 is a perspective view according to a fourth manner of embodiment.

FIG. 6 is a section view according to A-A of FIG. 5.

FIG. 7 is a perspective view according to a fifth manner of embodiment.

DETAILED DESCRIPTION OF THE DISCLOSURE

In this way, device (1) for production of stuffing and padding component according to the invention comprises a guide means, a drive means and a means of crumpling the product.

According to one characteristic, device (1) comprises a means of product supply.

We note here that the guide means is supported at least by a magnetic means of support.

It is understood that a stuffing component may also be a padding component, making it possible to surround, to pad or even to stuff the free spaces in a carton, around the item(s) to be packaged.

The invention concerns, more specifically, the means of magnetic support of the guide means, making it possible to locate a space around the guide means for the free circulation of the product and of the stuffing component and padding produced in this way by device (1), in order to avoid risk of jamming the product.

We specify here that a guide means is intended to support and perhaps even constrain within an area predetermined by the section of the guide means, the product as it travels forward, so that the product adapts to a predefined conformation prior to its crumpling.

The invention also concerns, in combination with the means of magnetic support, the drive means and/or the means of crumpling which are, advantageously, collapsible, in order to also sequentially allow free space in the area surrounding the guide means, for the purpose of limiting or even avoiding all risk of jamming the product while device (1) is operating.

We note here that device (1) according to the invention is intended to be supplied with at least one product item.

The product should advantageously be a strip or sheet of craft paper, comprising perforation lines, preferably packaged as a roll or as a strip of accordion-pleated paper.

In the following description, the terms “sheet”, “strip” or “product” will be used to designate the same entity to be crumpled.

We add here that the product is driven from the supply means by the drive means so that it is guided in the direction of the means of crumpling, advantageously all along the guide means, for the production of stuffing and padding components so that they can then be evacuated to the exterior of the device.

The product is thus placed in contact, at least in the drive means and of the crumpling means along the guide means, during the drive and crumpling phases of the product.

In the following description, a drive axis (Y), shall be understood to mean an axis oriented in the direction of product travel; a transverse axis (X) shall be understood to mean an axis oriented perpendicular to drive axis (Y) included largely in the mean plane of product travel; and a vertical axis (Z) shall be understood to mean an axis perpendicular to drive axis (Y) and to transverse axis (X).

It shall also be understood that the mean plane of product travel is the plane including drive axis (Y) and transverse axis (X).

Device (1) according to the invention may be positioned horizontally, namely that the product travel is oriented parallel to the ground, or positioned vertically, namely that the product travel is directed downwards perpendicularly or largely perpendicularly to the ground.

In order to coordinate with the description, the axis that is perpendicular to the mean plane of product travel, no matter what the positioning of device (1) may be, will be called vertical axis (Z).

The guide means comprises a product guide body (2) of which at least one part is mechanically attached to at least one constituent component of the device, as explained in greater detail in the rest of the description, whereas at least one other part of the guide body is supported by magnetic repulsion forces.

In fact, since the guide body extends along drive axis (Y), this latter requires at least two support points, for it to be held in position along drive axis (Y) of the product, for adequate functioning of the device according to the invention.

We note here that an excessive mobility along vertical axis (Z) of a guide means according to the manners of embodiment intended to be supplied by two strips of paper or two sides of a folded strip of paper, would present a risk of blockage of the product in the shaping block (5), as introduced in greater detail in the following description.

We specify here that at least one end of guide body (2) on side supported by repulsive forces, is free, namely, that the free end of the guide body is surrounded by a peripheral space.

According to one characteristic, the two ends of the means of guide body (2) are free, whereas at least a part of its section is mechanically attached to a constituent component of the device according to the invention, such as by the drive means.

The term “magnetic repulsion forces” shall be understood to mean a magnetic repulsion of two poles of the same polarity of two permanent magnets placed facing one another, or a pair formed by a permanent magnet and an electromagnet or of a pair of electromagnets.

It is understood that the electric polarities of an electromagnet are connected such that the electromagnet functions in repulsion.

According to some manners of embodiment, the mechanical degrees of freedom in a part of guide body (2), such as one of its ends, are supported by magnetic repulsion forces in another part of guide body (2), such as its other free end.

In other words, according to the previous manners of embodiment, at least one part of the guide body (2) is mechanically attached to a part of device (1) according to the invention, leaving mechanical degrees of freedoms in the aforementioned guide body (2), these mechanical degrees of freedom are held by magnetic repulsion forces in another part of guide body (2).

According to other manners of embodiment, the degrees of freedom that are mechanically blocked in one part of guide body (2) are left free or blocked by magnetic repulsion forces.

It is understood that axes (X, X'), (Y, Y') and (Z, Z') are orthogonal axes.

As an example, the degrees of freedom in translation along axes (X, X'), (Y, Y') and (Z, Z') of one end of guide body (2) are mechanically blocked, whereas at its other end the degrees of freedom in translation along axis (Z, Z') are blocked by magnetic repulsion forces.

As an example, the degrees of freedom in translation along to axes (Y, Y') and (Z, Z') and according to the degrees of freedom in rotation are mechanically blocked at one of the ends of a guide body (2), whereas the degrees of freedom in translation along axes (X, X') and (Z, Z') and the degrees of freedom in rotation are blocked by magnetic repulsion forces.

As an example, the degrees of freedom in translation along axes (X, X'), (Y, Y') and (Z, Z') and according to the degrees of freedom in rotation are mechanically blocked at one of the ends of a guide body (2), whereas the degrees of freedom in translation along axis (Y, Y') and the degrees of freedom in rotation along axis (Z, Z') are blocked by magnetic repulsion forces.

As an example, the degrees of freedom in translation along axes (X, X'), (Y, Y') and (Z, Z') and according to the degrees of freedom in rotation are mechanically blocked at one of the ends of a guide body (2), whereas the degrees of freedom in translation along axis (X, X') and the degrees of freedom in rotation along axis (X, X') are blocked by magnetic repulsion forces.

As an example, the degrees of freedom in translation along axes (Y, Y') and (Z, Z') and according to the degrees of freedom in rotation are mechanically blocked at one of the ends of a guide body (2), whereas the degrees of freedom in translation along axis (X, X') and the degrees of freedom in rotation along axis (Z, Z') are blocked by magnetic repulsion forces.

It is understood that numerous possibilities for mechanical and magnetic blockage can be considered and will not be described exhaustively in the present description.

According to the previous characteristic, at least a part of the exterior of a guide body (2) comprises a permanent magnet (3) or an electromagnet.

According to the illustrated manners of embodiment in FIGS. 1 and 7, a guide body (2) comprises a permanent magnet (3) at its free end.

According to the illustrated manners of embodiment in FIGS. 1 through 4 and 7, the poles of the permanent magnets (3) are oriented perpendicular to the mean plane of product travel.

According to the manner of embodiment illustrated in FIGS. 5 and 6, the poles of the permanent magnets (3) are oriented parallel to the mean plane of product travel.

According to another manner of embodiment, not shown, a guide body (2) comprises an electromagnet, for example at its free end or largely at its free end.

We add here that device (1) comprises a means of magnetic support around at least a part of the section of a guide body (2) placed facing at least one permanent magnet (3) or of an electromagnet placed inside or at the outside of at least one part of a guide body (2).

The term "a means of magnetic support" is understood to be a means of support, through magnetic repulsion forces that are in addition to the permanent magnets or electromagnets placed at guide body (2).

We note here that the means of magnetic support is placed so that it forms a space around the part of the guide body (2) that is placed in correspondence.

According to one additional characteristic, the means of magnetic support comprises a permanent magnet (3) or an electromagnet.

We add here that the means of magnetic support is in the form of a magnetic support (4), for example at least one section such as a bar or an enclosure, or even two portions of enclosure arranged opposite each other.

According to the manner of embodiment illustrated in FIG. 1, the magnetic support (4) is represented by a bar consisting of, for example, permanent magnets (3) placed facing each of the permanent magnets (3) placed on the guide bodies (2).

According to another manner [of] embodiment, as illustrated in FIG. 3, the magnetic support (4) is represented by two parallel bars, in which are arranged, in the separating space between the two bars, at least a part of the section of guide bodies (2), so as to leave a free space between the guide bodies (2) and the bars.

It shall be understood, and as was stressed earlier, that in order to obtain magnetic support by repulsion, the poles of the same polarity as permanent magnets (3), respectively arranged on a guide body (2), and at least one bar, are arranged so that they face each other.

This last characteristic makes it possible to support the guide bodies the entire time device (1) according to the invention, is functioning, while leaving a peripheral space around guide bodies (2) and advantageously all along their section and advantageously at at least one of their free ends.

According to another manner of embodiment, not shown, the magnetic support (4) is a hollow enclosure placed at the outside of at least one guide body (2).

According to one manner of execution, not shown, the magnetic support (4) consists of two portions of enclosure arranged opposite from each other [and] partially surrounding at least one guide body (2).

According to the illustrated manners of embodiment, at least one part of one guide body (2) has a longitudinal section.

According to the illustrated manners of embodiment, the guide means consists of multitude of guide bodies (2) of which at least a part of each of guide bodies (2) is mechanically attached to at least one constituent component of device (1), whereas at least one other part of each of the guide bodies (2) is held by magnetic repulsion forces.

We specify here that in the case where there are multiple guide bodies (2), each of the guide bodies (2) is oriented in the same direction, for example, opposite from the supply means.

According to the illustrated manners of embodiment in FIGS. 1 through 7, one of the ends of a guide body (2) is attached to the supply means, whereas its other end is free and held by magnetic repulsion forces.

According to another manner of embodiment, not shown, a free end of guide body (2) is held by magnetic repulsion forces facing the supply means, whereas at least one part along its longitudinal section is mechanically attached to a constituent element of device (1).

According to the preceding manner of embodiment, the end of the guide body (2) placed opposite from the supply means is likewise free and is held in place by magnetic repulsion forces.

According to one manner of execution, not shown, the end of the guide body (2) placed facing the supply means is completely free, namely, not fastened mechanically or held in place by magnetic repulsion forces, whereas at least one part of guide body (2) is mechanically fastened, for example the central part, for example by the drive means, whereas the end of the guide body (2) placed opposite from the supply means is held in place by magnetic repulsion forces.

According to another manner of execution, not shown, the end of the guide body (2) placed facing the supply means is held in place by magnetic repulsion forces, whereas at least one part of guide body (2) is mechanically fastened, for example the central part, for example by the drive means, while the end of the guide body (2) placed opposite from the supply means is completely free, namely not fastened mechanically or held in place by magnetic repulsion forces.

According to one additional characteristic, let us recall that a guide body (2) is in magnetic interaction with the magnetic support (4), but may likewise be in magnetic interaction, namely in magnetic repulsion with another guide body (2).

According to the manner of embodiment illustrated in FIG. 5, the poles of the permanent magnets (3) of the magnetic support (4) and of the permanent magnets (3) placed in guide body (2) are oriented along a transverse axis (X), so that one of the poles of a permanent magnet (3) of a guide body (2) interacts with a pole of the same polarity in the magnetic support (4), whereas the other pole interacts with that of another adjacent guide body (2).

In this way, according to the preceding manner of embodiment, two guide bodies (2) are held together by magnetic repulsion forces.

We add here that the supply means comprises a shaping block (5), likewise called a shaper.

We note here that the shaping block (5) comprises at least one slot (6) that is designed for the passage and shaping of the strip of paper.

According to the illustrated manners of embodiment in FIGS. 1, 2 and 4, the shaping block (5) of the supply means consists of straight slot (6) through which a product, preferably a strip of paper, is designed to pass.

According to the illustrated manners of embodiment in FIGS. 3 and 7, the shaping block (5) consists of two parallel slots (6) that are each designed to accommodate a sheet of paper.

According to the manner of embodiment illustrated in FIGS. 5 and 6, shaping block (5) consists of curved slot (6), partially shown, which makes it possible to roll up a sheet of paper onto itself, namely that the ends of slot (6) overlap onto each other in an offset manner.

We add here that as was explained previously, the drive means and the means of crumpling can permanently or sequentially enmesh the product.

According to the manners of embodiment shown in FIGS. 1, 3, 5 and 7, the drive means comprises a set of drive wheels (7) placed opposite from the mean plane of product travel.

According to the previous manners of embodiment, the set of drive wheels (7) are [sic] located in a space inserted between two guide bodies (2).

We specify here that devices (1) shown in FIGS. 1, 3, 5 and 7, comprise a drive train.

According to other manners of embodiment, the drive means is a means of drive-in translation, that is intended to function in a sequential manner.

The drive means illustrated in FIG. 2, is mobile both in translation along drive axis (Y) and along vertical axis (Z).

More specifically, the abovementioned drive means is retractable either by translation along vertical axis (Z) or by pivoting, and, in all cases, is mobile in translation along drive axis (Y).

These aforementioned drive means make it possible to release the product after it has travelled in the direction of the means of crumpling and after the crumpling sequence, making it possible to avoid the risk of jamming the product.

The product is thus rendered free after the travel and crumpling sequences, both by the drive means and by the means of crumpling in the guide means.

According to a first alternative of the preceding manner of embodiment, the drive means comprises a drive flap (8), preferably a series of drive flaps (8), mounted moveably along a shaft (9) which is mobile in rotation, whereas shaft (9) is likewise mobile in translation along drive axis (Y).

We specify here that shaft (9) attached to a drive flap (8) is for example, as illustrated in FIG. 2, set in a slot that is oriented parallel to drive axis (Y) placed in a plate that is placed perpendicularly to the mean plane of product travel.

As is illustrated in FIG. 2, drive flaps (8) are placed between the guide bodies (2), more specifically between the separating spaces of guide bodies (2).

According to the preceding alternative, the drive means comprises a pair of drive flaps (8), more specifically a series of pairs of drive flaps (8), with their respective free end [sic] being placed facing each other opposite relative to the mean plane of product travel.

We note here that while the product is being driven, the respective ends of the pair of drive flaps (8) are in contact with the product in a constraining manner, for the purpose of pushing it forward.

A drive flap (8) can adapt at least three positions, namely an "up", rest position in which drive flap (8) is retracted, the free end of drive flap (8) not being in contact with the product, as illustrated in FIGS. 1 to 3, as well as a "down" position of contact of the free end of the drive flap (8) with the product by rotating the shaft, followed by a drive position of the product by translating the shaft (9) along drive axis (Y), parallel to a median plane of moving the product in the direction of the means of crumpling.

This motion also comprises the retraction of the drive flaps (8) and then their return to their starting position by translation of the shaft (8) [sic] in the direction of the supply means.

According to a second alternative to the preceding manner of embodiment, not shown, the drive means comprises a drive body that is mobile only according to translational movements, most preferably consisting of a series of drive bodies placed vertically aligned with spaces distributed between pairs of guide bodies (2).

We add here that that a drive body is moveable along a vertical axis (Z) and along a drive axis (Y).

A drive body may adopt at least two positions, namely a first contact position, in which the drive body is in contact with the product, and a second retracted rest position, since the drive body is not in contact with the product.

The drive body is designed to follow a forward motion of the product, in which the drive body starts in a second overlapped position, then is subjected to a vertical translation along a vertical axis (Z) so that it adopts the first contact position, then is subjected to a translation along a drive axis (Y) to move the product forward in the direction of the means of crumpling.

This motion also comprises the lift of the drive body, then its return to its start position by translation in the direction of the supply means.

According to the preceding manner of embodiment, the drive means comprises a pair of drive bodies, advantageously a series of pairs of drive bodies, with their respective free end [sic] being placed facing each other opposite from the mean plane of product travel.

We add here that the means of crumpling according to the invention may be produced by a means of continuous crumpling in which the means of crumpling is in constant contact with the product or by a sequential means of crumpling in which the means of crumpling uses back-and-forth movements in a position that constrains the product and in a position in which the product is not constrained.

According to the manner of embodiment illustrated in FIG. 5, the means of crumpling is continuous and is carried out by a pair of crumpling wheels (10).

According to the illustrated manners of embodiment in FIGS. 1 through 3 and 7, the means of crumpling may be considered as a means of sequential obstruction, which blocks the travel of the paper moved by the drive means along the guide means.

In this way, the means of crumpling can adopt at least two positions, a position constraining the product, which is designed to obstruct the travel of at least one sheet of paper and crumple this paper while the product is traveling forward and/or while the means of crumpling in contact with the product is moving, to a position that no longer constrains the product, and which is designed to allow the crumpled paper to travel forward downstream of the means of crumpling so that it can be removed.

In this way, the position that no longer constrains the product, may allow the product to travel free, in the guide means, towards its evacuation point in order to avoid all risk of jamming the product both in the drive means and in the means of crumpling along the guide body.

In other words, the means of crumpling is designed to be alternatively in a contact position that constrains the product and a position in which the means of crumpling is retracted by at least one back-and-forth motion from the retracted position to the crumpling position itself.

In this way, the position in which the means of crumpling does not constrain the product's travel can be considered as being a retracted position or a product release position.

The term "retracted position" or "product release position" shall be understood to mean a withdrawn position, namely a position of the means of crumpling that is no longer in contact with the product or a product contact position, but rather in a position where the means of crumpling does not exert any force against the product, leaving its evacuation free downstream of the means of crumpling.

In this way, the means of crumpling is mobile at least along a vertical axis (Z), perpendicular to drive axis (Y), which is parallel to the product travel.

According to one additional characteristic, the means of crumpling according to the invention is mobile along a transverse axis (X) perpendicular to drive axis (Y).

According to another characteristic, the means of crumpling is mobile along drive axis (Y).

According to one manner of execution, the means of crumpling is mobile along vertical axis (Z) and along drive axis (Y).

According to another manner of execution, the means of crumpling is moveable along vertical axis (Z) and along transverse axis (X).

According to another advantageous manner of embodiment, the means of crumpling is mobile along vertical axis (Z) and at the same time along transverse axis (X) and along drive axis (Y).

According to one advantageous characteristic, the means of crumpling comprises a crumpling flap (11) that is attached to a shaft (9) or a crumpling rod (12).

According to the illustrated manners of embodiment in FIGS. 1 through 3, the means of crumpling comprises a crumpling flap (11).

According to the manner of embodiment illustrated in FIG. 7, the means of crumpling consists of crumpling rod (12).

We add here that a crumpling flap (11) is moveable along a vertical axis (Z) and along a drive axis (Y) in a rotational motion.

According to one manner of execution, the pivoting of shaft (9) is advantageously in both directions of rotation.

According to the preceding manner of execution, the displacement of the rotation of a crumpling flap (11) makes it possible to lock the crumpling in a "down" position, in intermediate positions and/or in the down position in contact with the product and the complete release of the product in a fully retracted position or in a product release position that does not constrain the product.

According to one additional characteristic, a crumpling flap (11) is moveable along a transverse axis (X) in a translational movement.

We specify here that a crumpling flap (11) is a part that is mounted so that it pivots about shaft (9) or integrally with the shaft (9) which is mounted movably in rotation, whose free end is designed to constrain the product at least along vertical axis (Z).

According to the first manner of embodiment, the free end of the crumpling flap (11) is rounded in order to avoid damaging the sheet of paper while the crumpling flap (11) is moving on contact with the product.

We also specify here that a crumpling rod (12) is directed in the direction of the product and is moveable along vertical axis (Z), advantageously along drive axis (Y) and advantageously along transverse axis (X) by translational movements.

According to one manner of execution, a crumpling rod (12) is moveable along vertical axis (Z) and along drive axis (Y).

According to another manner of execution, a crumpling rod (12) is moveable along vertical axis (Z) and transverse axis (X).

According to the manner of embodiment illustrated in FIG. 7, a crumpling rod (12) is, at the same time, moveable along vertical axis (Z), drive axis (Y) and transverse axis (X) by translational movements.

According to one additional characteristic, the means of crumpling consists of series of crumpling flaps (11) or crumpling rods (12) aligned along a transverse axis (X) perpendicular to drive axis (Y).

According to the previous characteristic, crumpling flaps (11) in a series are attached to a shaft (9), whereas crumpling rods (12) in a series are fastened for example to a plate (13).

According to the illustrated manners of embodiment in FIGS. 1 through 3, shaft (9) is attached to a series of crumpling flaps (11) and is moveable in rotation by back-and-forth movements.

According to a first alternative of the previous manners of embodiment, shaft (9) is likewise mobile in translation along a transverse axis (X) by back-and-forth movements.

According to the preceding alternative, the crumpling flaps (11) in a series each follow the same translational back-and-forth movement along a transverse axis (X).

According to a second alternative to the manners of embodiment shown in FIGS. 1 through 3, a pair of crumpling flaps (11) in a series are moveable along a transverse axis (X) as they get closer to each other.

In other words, according to the preceding alternative, the crumpling flaps (11) of a series are moveable two by two by a translational movement as they get closer along a transverse axis (X).

For this reason, each of the crumpling flaps (11) or each of the pairs of crumpling flaps (11) in a series are mounted moveably and independently on shaft (9), at least along transverse axis (X) following shaft (9) to which they are attached.

According to the manner of embodiment illustrated in FIG. 7, crumpling rods (12) are moveable within the plate along a transverse axis (X) and along a drive axis (Y), and either along a vertical axis (Z) or the plate is moveable along a vertical axis (Z).

Crumpling rods (11) [sic] and crumpling flaps (12) [sic] can, for example, be moved in translation by linear motors, not shown.

According to the previous manners of embodiment, the means of crumpling consists of a multitude of series of crumpling flaps (11) or crumpling rods (12), mounted on shafts ( ) or parallel plates along drive axis (Y).

This last characteristic makes it possible to simultaneously crumple a larger part of the product and to standardize the crumple over the length of the product for the purpose of producing a stuffing and padding component with a higher yield.

According to some manners of embodiment, the crumpling flaps (11) or crumpling rods (12) of a first series are respectively offset along drive axes (Y) relative to those of a second series.

According to other manners of embodiment, crumpling flaps (11) or the crumpling shafts (12) of a first series are respectively aligned along drive axes (Y) relative to those of a second series.

We add here that the means of crumpling may be placed on one side of the product along vertical axis (Z) or on either side of the product, opposite from or offset along the mean plane of product travel, namely the plane that includes drive axis (Y) and transverse axis (X).

As shown in FIGS. 1 to 3 and 7, the means of crumpling is placed on either side of the product.

According to the illustrated manners of embodiment in FIGS. 1 through 3, a first series of crumpling flaps (11) is placed opposite from relative to a second series of crumpling flaps (11), with the crumpling flaps (11) of each of the series being aligned along a vertical axis (Z).

According to the preceding manner of embodiment, each of shafts (9) attached to a series of crumpling flaps (11) is placed in parallel to and equidistant from the mean plane of product travel.

According to one additional characteristic, the crumpling flaps (11) or crumpling rods (12) of both adjacent series can function according to crumpling sequences, by going to or away from each other.

Device (1) consists of a control center that controls the crumpling sequences of the crumpling flaps (11) or of the crumpling rods (12) in the same series and in multiple series relative to each other.

The control of different sequences during a crumpling cycle results in stuffing or padding components that have different structures.

According to the manner of embodiment illustrated in FIG. 1, the device comprises a set of drive wheels (7) and a crumpling flap (9), more specifically a series of sets of drive wheels (7) and a series of crumpling flaps (9).

According to the manner of embodiment illustrated in FIG. 2, device (1) comprises a drive flap (8) and a crumpling flap (11), more specifically a series of drive flaps (8) and a series of crumpling flaps (9).

According to the manner of embodiment illustrated in FIG. 3, device (1) comprises a set of drive wheels (7) and a crumpling flap (9), more specifically a series of sets of drive wheels (7) and two series of series of crumpling flaps (9).

According to the manner of embodiment illustrated in FIG. 7, device (1) comprises a set of drive wheels (7) and a crumpling rod (12), more specifically a series of drive wheels (7) and a series of crumpling rods (12).

The invention claimed is:

1. A device for the production of stuffing product comprising a product guide means, a product drive means along a drive axis (Y), a means of crumpling the product, wherein the product guide means is mechanically attached to a part of the device by at least a part of the product guide means, wherein the device further comprises a means of magnetic support around at least another part of the product guide means, and wherein the another part of the guide means comprises at least one permanent magnet or an electromagnet placed inside or outside of the another part of the guide means and is held by magnetic repulsion forces onto the means of magnetic support in order to form a space around the another part of the guide means.

2. A device according to claim 1, wherein the another part of the product guide means that is held in place by magnetic repulsion forces is held onto a magnetic support, so as to form a space between the product guide means and the magnetic support.

3. A device according to claim 2, wherein the product guide means and the magnetic support each comprise a permanent magnet and/or an electromagnet arranged two by two opposite each other.

4. A device according to claim 2 wherein at least a substantial portion of one end of the product guide means is free and held in place by magnetic repulsion forces to the magnetic support.

5. A device according to claim 2, wherein the magnetic support comprises a bar or two bars arranged opposite from on either side of the product guide means.

6. A device according to claim 1, wherein the product guide means is mechanically attached to a shaping block as a supply means, placed upstream from the drive means.

7. A device according to claim 6, wherein the shaping block comprises two slots each designed to have a product pass through the shaping block or one slot whose ends overlap and which is designed to feed a crumpled product onto itself.

8. A device according to claim 7, wherein the product guide means is mechanically fastened between the two slots of the shaping block or between the one slot of the shaping block whose ends overlap.

9. A device according to claim 1, wherein the at least one part of the product guide means is mechanically attached to a means of crumpling or to a drive means.

* * * * *